United States Patent
Righele et al.

(10) Patent No.: US 6,287,188 B1
(45) Date of Patent: Sep. 11, 2001

(54) FEEDING DEVICE OF A STUFFING MACHINE; IN PARTICULAR FOR GROUND MEATS OR THE LIKE

(75) Inventors: Giampietro Righele; Paolo Righele, both of Zane'(IT)

(73) Assignee: Refin S.r.l., Vicenza (IT)

( * ) Notice: Subject to any disclaimer, the term of this patent is extended or adjusted under 35 U.S.C. 154(b) by 0 days.

(21) Appl. No.: 09/502,787

(22) Filed: Feb. 11, 2000

(30) Foreign Application Priority Data

Feb. 12, 1999 (IT) .............................................. RM99A0103

(51) Int. Cl.⁷ ..................................................... A22C 11/00
(52) U.S. Cl. ................................................. 452/30; 452/35
(58) Field of Search .................................. 452/30, 35, 138

(56) References Cited

U.S. PATENT DOCUMENTS

| | | | |
|---|---|---|---|
| 4,032,049 | * 6/1977 | Roberts | 452/30 |
| 4,370,779 | * 2/1983 | Meier | 452/35 |
| 5,367,860 | * 11/1994 | Cullen | 53/576 |
| 5,595,865 | * 1/1997 | Possanza et al. | 430/642 |

FOREIGN PATENT DOCUMENTS

0138830 * 1/1957 (SU) ..................................... 452/138

\* cited by examiner

*Primary Examiner*—Willis Little
(74) *Attorney, Agent, or Firm*—Browdy and Neimark

(57) ABSTRACT

The invention relates to a feeding device for a stuffing and dosing pump of a vacuum stuffing machine for alimentary paste products, preferably ground or extruded meats.

More specifically, the feeding device provides two elical scroll thrusting elements, facing each other and placed in the space under the hopper in order to operate continuously on the meat paste, thrusting and compacting it in the direction and toward the inlet of the stuffing pump.

4 Claims, 2 Drawing Sheets

FEEDING DEVICE OF A STUFFING MACHINE; IN PARTICULAR FOR GROUND MEATS OR THE LIKE

BACKGROUND OF THE INVENTION

1. Technical Field of the Invention

The present invention relates to a feeding device for a stuffing and dosing pump of a vacuum stuffing machine for alimentary pastes, preferably ground or extruded meat.

More specifically, the invention relates to mechanical thrusting means positioned in the space under the hopper in order to operate continuously on the meat paste, thrusting and compacting it in the direction and toward the inlet of said stuffing pump.

2. Prior Art

The expression "meat paste" must be intended as relating to a bulk of meat more or less finely ground by a grinder, or meat extruded from a die plate, which substantially generates a meat emulsion. Traditional stuffing machines, currently on the market, comprise essentially a truncated cone hopper combined with an internal rotating mixing element, which facilitates the conveyance of the meat paste downward in the direction of the inlet hole of the stuffing pump whose chamber, operating in a condition of substantial vacuum, sucks the meat paste in.

Said internal rotating mixer is, as it is known, constructed both as a shaft provided with radial jutting pegs located at angularly and axially staggered positions, and as a spiral helix which generates a downward thrust on the food product paste stored in the hopper in the direction of the stuffing pump.

Over the last few years there emerged as highly desirable the need to improve the quality of the stuffing operation, particularly, as it is well known to the skilled in the art, in the attempt to guarantee a perfect withdrawal of air from the product by means of new use techniques for the thrusting devices which thrust the material toward the stuffing pump, in order to make the product itself bright in its sliced state, ready for consumption. This is a desirable objective for any food product paste which is conveyed to the stuffing and for all the various shapes and dimensions of the stuffing itself.

The currently known stuffing systems are ill-suited to meet the needs of the different kinds of meat pastes intended for stuffing, and they do not always result in high quality products. With regard to this, it must be stressed that when the stuffing is obtained by means of traditional hoppers operatively linked with the known conveyor devices quite a few problems arise, whose solution has frequently proved rather difficult. It has been known for a long time that obtaining a constant feeding of the food product paste with the traditional hoppers and the known associated elements is difficult, because the vacuum differential between the existing vacuum in the chamber of the stuffing pump and the vacuum generated in the hopper for an improved deaeration of the paste itself is not enough to generate a sufficiently positive pressure on the product, so as to guarantee continuously a complete filling of the stuffing pump chamber through suction.

OBJECT OF THE INVENTION

The aim of the present invention is to overcome the above stated drawbacks connected with the known devices by setting up a stuffing pump feeding device able to guarantee the perfect withdrawal of air from the paste of the product intended for stuffing, in order to present to the consumer sliced products in a bright and compact state and with a pleasant look, i.e. a higher quality food product of the stuffed type.

A further aim of the present invention is to generate a continuous mechanical thrust exerting an advantageously sufficient pressure on the product intended for stuffing so that the product itself will be pressed into the inlet hole of the stuffing pump even in the presence of a very small difference between the value of the existing vacuum in the hopper and the value of the existing vacuum in the chamber of the stuffing pump.

All this guarantees a complete and continuous filling of the stuffing pump allowing, moreover, for the exploitation even in the hopper of a high vacuum value which carries out a complete effective withdrawal of the air possibly present in the product, aided also by a rotating mixing shaft located in the hopper above said feeding device.

Therefore, an aim of the present invention is also to provide a perfect mixing homogeneity so that the feeding device will be ideal for use in any branch of the food industry as it mixes in an optimal way and conveys to the stuffing pump all kinds of meat products, spun15 paste cheese and more or less soft food preserves.

Another aim of the present invention is to provide an extremely hygienic application as every part which gets in contact with the product is easily removable for cleaning and disinfection operations, which must be carried out systematically in order to eliminate the product particles which, by sedimenting in the interstices between the fixed and moving elements, would cause, as it is well known to the skilled in the art in the food industry, the growth of bacteria which are not completely eliminated by means of the usual cleaning operations.

A further aim of the present invention is to provide a stuffed product of higher density with the related advantages of a better ripening over time, as well as a longer preservation period.

More still, a further aim of the present invention is to provide a compact product with the advantage, for the same weight, of economizing considerably on the casings and improving the aspect of the product for presentation to the client.

SUMMARY OF THE INVENTION

These and still further aims are all obtained by means of the feeding device, according to the present invention, of a stuffing machine operating under vacuum for products such as ground meat or any food product which is conveyed to a storage hopper in order to be conveyed to a stuffing and dosing pump by means of mechanical feeding thrusting means, made up by helical scroll elements placed immediately and sequentially in the space under the hopper and operating separately with continuity on said product by thrusting and compacting it in the direction and toward the inlet of said stuffing pump, said helical thrusting elements, facing each other, operating through helixes equivalent to each other, free of direct contact.

According to an embodiment of the present invention, the feeding device for the stuffing machine operating under vacuum comprises two helical thrusting elements shaped as conical or truncated cone scroll and with helixes with a development differentiated as a function of the characteristics of the product intended for stuffing and of the formation dynamics of the stuffing itself.

BRIEF DESCRIPTION OF THE DRAWINGS

With reference to the above explanation a preferred embodiment is illustrated in the figures of the annexed drawings as neither limiting nor binding as for the reciprocal position of its components and the subsequent simplifications which could result therefrom; said embodiment will be hereinafter disclosed with reference to the following figures wherein.

DETAILED DESCRIPTION OF THE PREFERRED EMBODIMENT(S) OF THE INVENTION

Figure 1:
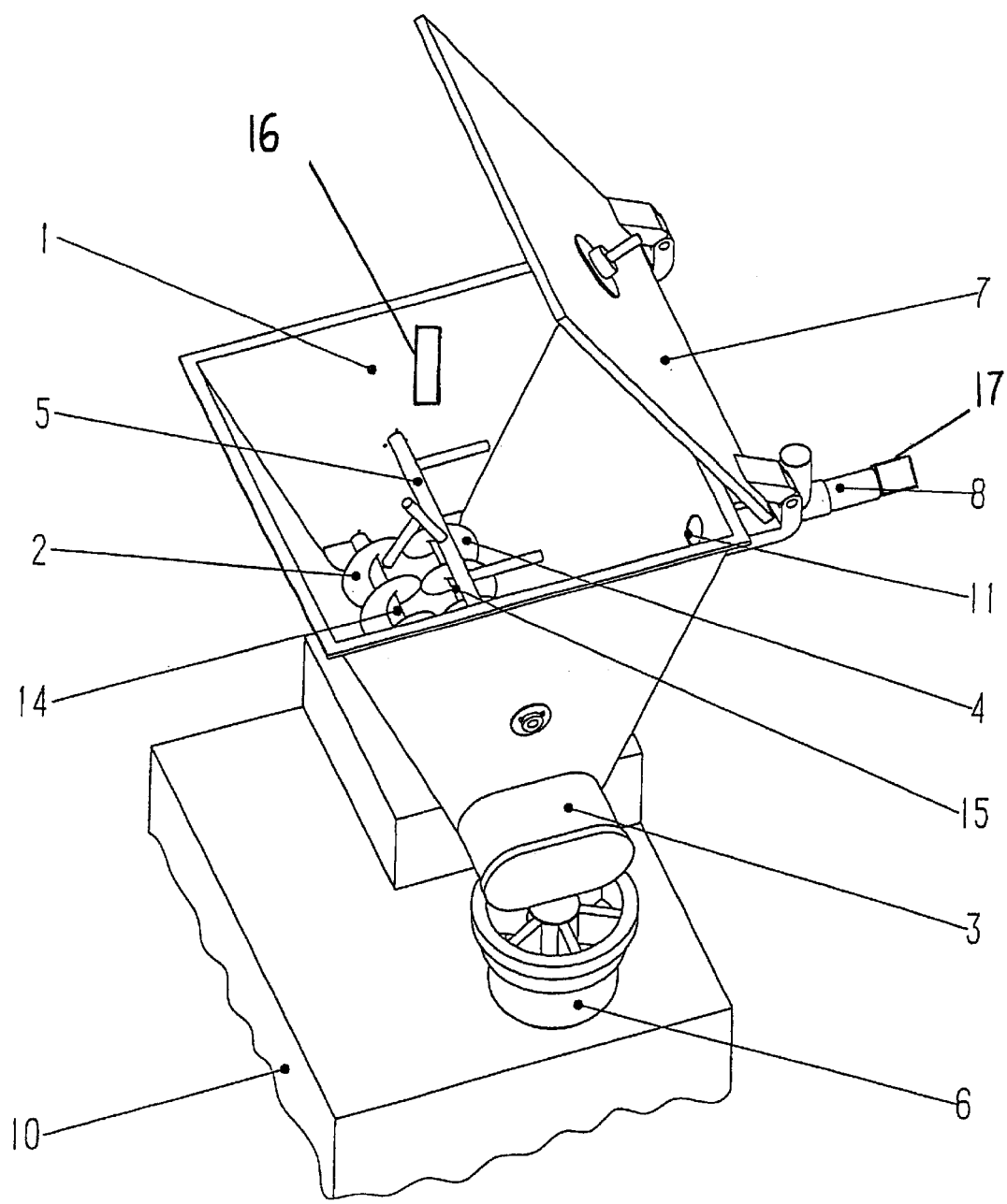
FIG. 1 is a schematic view in axonometric perspective of the structure of the present invention, showing the hopper 1 with the peg mixing shaft 5 and with the underlying helical scroll elements 2 and 4, which thrust the product toward the conveying funnel 3 of the stuffing and dosing pump 6.
Figure 2:
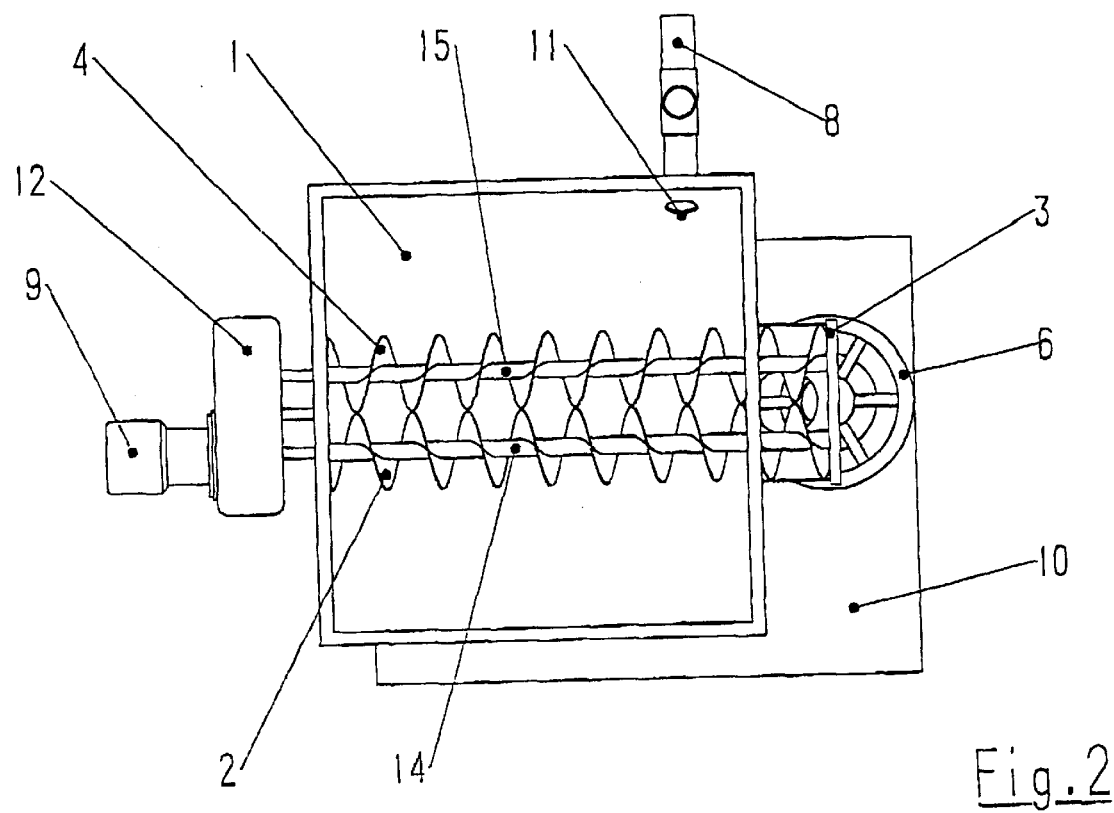
FIG. 2 is a schematic top view showing the two helical scroll elements 2 and 4 facing each other, with the axes of the shafts 14 and 15 lying on a horizontal plane, and operating through equivalent helixes.

For the sake of clarity of the assembly, parts which are not essential to the invention such as the feeding unit to the hopper, the sensor for opening and closing the feed loading of the hopper with the product itself, and the stuffing pump with the actual stuffing machine as well as still other parts have been omitted from or barely set forth in the figures as they are known per se, and, moreover, are not relevant to the understanding of the present invention. In the figures identical parts, or parts carrying out the same or equivalent functions, are indicated by identical references.

With reference to the figures, a hopper 1 of an advantageously truncated conical shape is designed to collect the food product in paste form from a feeding tube 8 and from a relative output hole 11, while a lid 7 is in its airtight closed position in order to allow a suitable vacuum inside the hopper itself. A high vacuum value inside the hopper 1 aids an automated loading method for the hopper itself by exploiting the suction of the food product itself through a feeding tube 8. A high vacuum value inside the hopper 1 guarantees an effective withdrawal of the air possibly present in the food product paste, and said air withdrawal is also aided by a peg rotating mixer shaft 5, located and fastened inside the hopper above two helical scroll elements 2 and 4. When the food product paste in the hopper decreases below a pre-established level, a level sensor 16 of known technique generates a signal which causes the opening of a valve 17 which intercepts the feeding tube 8, and as an effect of the suction generated by the vacuum the product paste coming from the mass stored in a storage unit (not illustrated), is sucked into the hopper through a hole 11. Once the pre-established level has been reestablished, the level sensor will activate the closing of the valve 17, preventing passage of the product along the feeding tube 8, thus carrying on the repetition of the opening and closing cycle illustrated above.

The helical scroll elements 2 and 4 rotate continuously operatively starting a stuffing pump 6, and therefore a stuffing machine 10. The mentioned helical scroll elements 2 and 4 are integral with their relative shafts 14 and 15, which rotate by means of a driving source 9 through a gear transmission 12.

Said gear transmission 12 transmits directions of rotation to the shafts 14 and 15 so as to necessarily carry out the continuous thrusting of the food product paste along the direction of a conveyor funnel 3 toward the stuffing area.

The innovative feeding device comprising the two helical scroll elements 2 and 4 provides a specific and rational location of the axes of the shafts 14 and 15, which lie substantially on an horizontal plane, therefore allowing a considerable construction simplification and an optimal functionality. All this allows, also, a timely cleaning by the operator assigned to the operative control of the stuffing machine 10 and advantageously does not allow, thanks to the location of the abovementioned elements, any sliding friction contact between the operative thrusting surfaces acting on the food product paste, thus making the device itself highly qualified for the food industry according to the regulations of the strictest sanitary rules.

Figure 3:
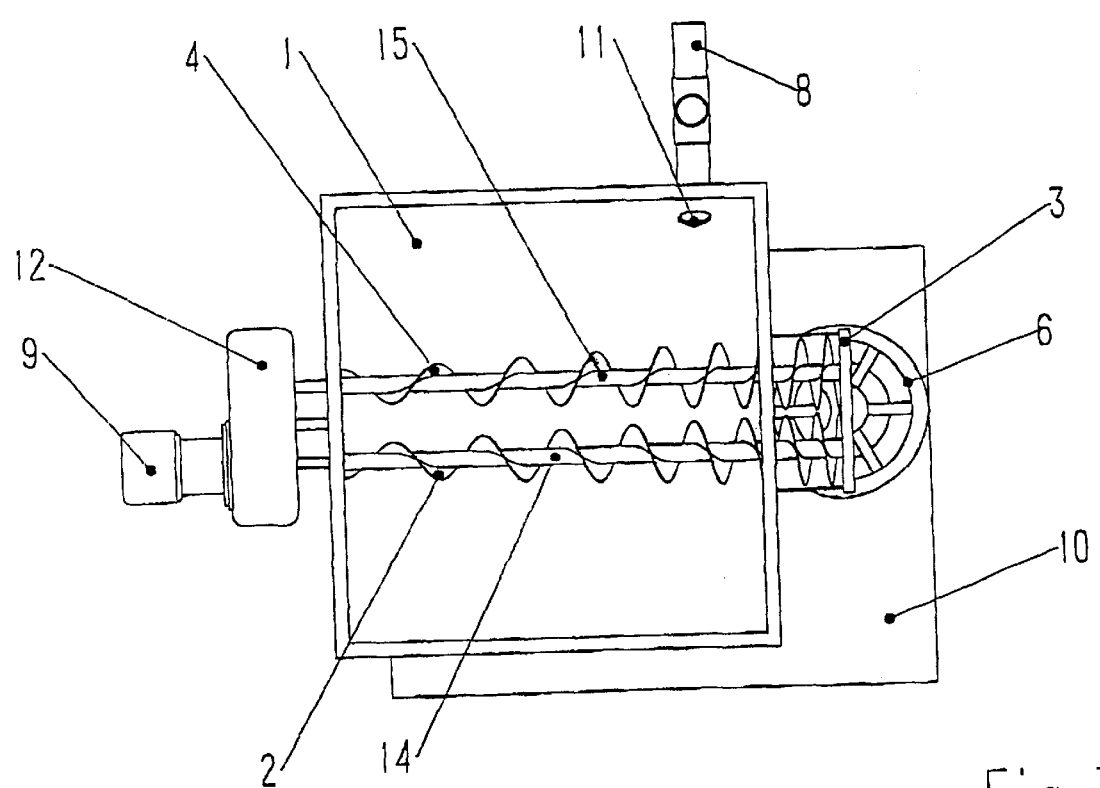
FIG. 3 is a schematic top view showing the two helical scroll elements facing each other and of a substantially truncated conical shape.

From the experimental tests carried out by the Applicant the use of helical scroll elements of substantially truncated conical shape has at times proved advantageous for food product pastes of specific density and fineness, as showed in FIG. 3.

It will be evident to the skilled in the art that the present feeding and thrusting device is susceptible of various modifications and variations, all of them falling within the protective scope of the invention's concept.

Furthermore, all details can be replaced by technically equivalent ones. It is also obvious that the materials used as well as the shapes and dimensions, can be of any Mind depending on one's needs, without being excluded from the protective scope of the following

What is claimed is:

1. A stuffing machine for products such as ground or extruded meat or similar food products, comprising:

a storage hopper to receive the product having an airtight lid to permit forming of a vacuum in the hopper;

the vacuum assisting loading the product into the hopper from a feed tube;

a level sensor which opens and closes a valve in the feed tube to control the loading of the product;

a mixing arm having pegs rotatably engaged in the hopper;

two mechanical thrusting means made up by helical scroll means located in a space under the hopper and the mixing arm;

the two mechanical thrusting means operating separately with continuity on the product, thrusting and compacting the product in a direction and into an inlet of a vane stuffing pump located at an exterior end of the hopper, said helical thrusting elements facing each other operating with equivalent helixes.

2. The stuffing machine according to claim 1, wherein said two helical thrusting elements are shaped as conical or truncated cone scroll with differentiated development helixes as a function of characteristics of the products intended for stuffing and formation dynamics of the stuffing itself.

3. The stuffing machine according to claim 1, wherein, axes of said helical thrusting elements lie substantially on a horizontal plane.

4. The stuffing machine according to claim 2, wherein axes of said helical thrusting elements lie substantially on a horizontal plane.

* * * * *